(12) United States Patent
Greenwood et al.

(10) Patent No.: US 12,276,258 B2
(45) Date of Patent: Apr. 15, 2025

(54) VERTICAL AXIS WIND TURBINE AND METHOD OF USE THEREOF

(71) Applicants: Warren Greenwood, Yorkshire (GB); Ronald Greenwood, Yorkshire (GB)

(72) Inventors: Warren Greenwood, Yorkshire (GB); Ronald Greenwood, Yorkshire (GB)

(*) Notice: Subject to any disclaimer, the term of this patent is extended or adjusted under 35 U.S.C. 154(b) by 7 days.

(21) Appl. No.: 18/271,939

(22) PCT Filed: Jan. 27, 2022

(86) PCT No.: PCT/GB2022/050208
§ 371 (c)(1),
(2) Date: Jul. 12, 2023

(87) PCT Pub. No.: WO2022/171980
PCT Pub. Date: Aug. 18, 2022

(65) Prior Publication Data
US 2024/0068440 A1 Feb. 29, 2024

(30) Foreign Application Priority Data

Feb. 9, 2021 (GB) ..................... 2101747

(51) Int. Cl.
*F03D 3/00* (2006.01)
*F03D 3/04* (2006.01)
(Continued)

(52) U.S. Cl.
CPC ............. *F03D 3/0427* (2013.01); *F03D 9/20* (2016.05); *F03D 9/34* (2016.05); *F05B 2270/506* (2013.01)

(58) Field of Classification Search
CPC . F03D 3/0427; F03D 9/20; F03D 9/34; F03D 9/28; F03D 3/0409; F03D 9/25; F05B 2270/506
See application file for complete search history.

(56) References Cited

U.S. PATENT DOCUMENTS 4,415,814 A * 11/1983 Martinez ............... F03D 3/0409
290/55
4,503,673 A * 3/1985 Schachle ................. F03D 15/00
416/41

(Continued)

FOREIGN PATENT DOCUMENTS

CN 201141338 Y 12/2007
EP 2418378 A2 2/2012
(Continued)

OTHER PUBLICATIONS

International Search Report, International Searching Authority, PCT/GB2022/050208, Dated May 2, 2022.
(Continued)

*Primary Examiner* — Julio C. Gonzalez
(74) *Attorney, Agent, or Firm* — Reichel Stohry Dean LLP; Mark C. Reichel; Natalie J. Dean (57) ABSTRACT

Wind driven apparatus is provided including upright support means and a plurality of wind directing wall members protruding outwardly from the upright support means at spaced apart intervals. The area between two adjacent wind directing wall members creates a wind collection section for collecting and directing wind in use. At least one opening is defined in the upright support means in each wind collection section for allowing wind, air and/or air pressure collected in the wind collection section to pass through said at least one opening and into an inner compartment defined in the upright support means. Drive shaft means provided in the inner compartment of the upright support means and rotatable means provided on and/or associated with the drive shaft means are rotatable as a result of air pressure and/or air flowing into the inner compartment via said at least one opening. Rotation of the drive shaft means can be used to
(Continued)

drive electricity generating means, hydraulic pump means and/or drive transmission means in use.

16 Claims, 9 Drawing Sheets

(51) Int. Cl.
    *F03D 9/20*      (2016.01)
    *F03D 9/34*      (2016.01)

(56) References Cited

U.S. PATENT DOCUMENTS

| | | | |
|---|---|---|---|
| 5,454,694 A | 10/1995 | O'Dell | |
| 5,969,430 A * | 10/1999 | Forrey | F03D 3/0463 290/44 |
| 6,666,650 B1 | 12/2003 | Themel | |
| 6,966,747 B2 * | 11/2005 | Taylor | F03D 3/0427 415/908 |
| 7,969,036 B2 * | 6/2011 | Chung | F03D 9/25 290/55 |
| 2006/0275105 A1 | 12/2006 | Roberts et al. | |
| 2016/0025067 A1 | 1/2016 | Pritash | |

FOREIGN PATENT DOCUMENTS

| | | | | |
|---|---|---|---|---|
| GB | 667587 A | | 3/1952 | |
| GB | 2275970 A | * | 9/1994 | F03D 1/04 |
| WO | 1991019093 A1 | | 12/1991 | |
| WO | 2018/055636 A1 | | 3/2018 | |

OTHER PUBLICATIONS

Written Opinion of the International Searching Authority, International Searching Authority, PCT/GB2022/050208, Dated May 2, 2022.

* cited by examiner

VERTICAL AXIS WIND TURBINE AND METHOD OF USE THEREOF

The present invention relates to wind driven electricity generating apparatus and to a method of use and/or manufacture thereof. The present invention also relates to wind driven apparatus for use with electricity generating apparatus and to a method of use and/or manufacture thereof.

The power of the wind has been utilized for thousands of years for powering boats via sails, for grinding grain via windmills, for driving water pumps and/or the like. More recently, the power of wind has been used to generate electricity via wind turbines. An example of a conventional wind turbine includes a support tower with an external turbine located at the top of the tower. The external turbine typically comprises three turbine blades that rotate about a horizontal axis when driven by the wind. A gearbox is located at the top of the turbine to allow the rotation of the turbine blades to drive an electrical generator. There are many variations of the above described wind turbine, such as fewer or more blades, the type of blades used, the axis about which the blades rotate, the size of the turbine, the type of electrical generator driven by the turbine blades and/or the like. However, common problems associated with all such conventional wind turbines are that they only typically harness a fraction of the wind energy available and therefore do not utilise the renewable wind source efficiently. For example, conventional wind turbines are only 35-45% efficient. The turbine relies on the kinetic energy of the wind being used to directly drive rotation of the external turbine and so the amount of wind available directly impacts on the amount of electricity that can be produced by the apparatus. If too little wind is available, the external turbine will not turn. If too much wind is available, the external turbine may have to be switched off to prevent overheating and damage of the turbine and gearbox. The external turbine is mounted at the top of the support tower and is difficult and expensive to maintain and service. Also, due to large conventional wind turbines having to be located in relatively remote areas due, for example, to their size, for safety reasons, to maximise their exposure to wind and due to the aesthetic impact they have on landscapes, the relatively small amount of electricity that is produced by the turbines is degraded the further the turbines are located from a sub-station. Furthermore, conventional turbines are subject to environmental issues, such as flicker and noise.

More recently, wind generating electricity apparatus has been proposed that attempts to utilise the wind's energy indirectly to generate electricity. For example, WO2019082329 discloses apparatus whereby wind is directed to a wind turbine through a wind channel extending in the vertical direction. The peripheral wall of the wind channel has an air intake opening defined therein and the bottom end of the wind channel is closed. A top end of the wind channel is open to allow air entering the wind channel via the air intake opening to be discharged. A wind turbine is located at the top of the wind channel adjacent the top discharge end and is driven by wind passing through the wind channel. A hydraulic pump is also located at the top of the wind channel and is driven by rotation of the wind turbine. The hydraulic pump drives a hydraulic motor which is then used to drive an electricity generator. However, the above apparatus still suffers from many of the disadvantages associated with conventional wind turbines mentioned above.

CN207761879 discloses a double duct vertical axis aerogenerator including an outer duct used to absorb wind energy and increase the flow rate of airflow created by the wind. An inner channel is provided to absorb wind energy and to generate negative pressure inside the same. This causes the air flow in the outer channel to be pulled in an upwardly direction for driving an impeller. The impeller is used to generate electricity.

It is an aim of the present invention to provide wind driven electricity generating apparatus which overcomes the abovementioned problems.

It is a further aim of the present invention to provide a method of using and/or manufacturing wind driven electricity generating apparatus which overcomes the abovementioned problems.

It is a yet further aim of the present invention to provide wind driven apparatus for use with electricity generating apparatus that overcomes the abovementioned problems.

It is a yet further aim of the present invention to provide a method of using and/or manufacturing wind driven apparatus for use with electricity generating apparatus that overcomes the abovementioned problems.

It is a yet further aim of the present invention to provide apparatus and/or a method of use thereof for creating sustainable wind energy suitable for the $21^{st}$ Century.

According to a first aspect of the present invention there is provided wind driven apparatus, said wind driven apparatus including upright support means, a plurality of wind directing wall members protruding outwardly from the upright support means at spaced apart intervals, the area between two adjacent wind directing wall members creating a wind collection section for collecting and directing wind in use, at least one opening defined in the upright support means in each wind collection section for allowing wind, air and/or air pressure collected in the wind collection section to pass through said at least one opening and into an inner compartment defined in the upright support means, drive shaft means provided in the inner compartment of the upright support means and rotatable means provided on and/or associated with said drive shaft means, the drive shaft means and rotatable means rotatable in use as a result of air pressure and/or air flowing into the inner compartment via said at least one opening, and wherein rotation of the drive shaft means can be used to drive electricity generating means, hydraulic pump means and/or drive transmission means in use.

The above apparatus results in the significant capture of wind and a resulting build-up of air pressure in each or one or more of the wind collection sections when wind is blowing outside. This capture and build-up of air pressure within one or more of the wind collection sections is released through the one or more openings in the upright support means and into the inner compartment. The air pressure and/or air flow in the inner compartment drives rotation of the rotatable means and drive shaft means. Rotation of the drive shaft means in turn can be used to drive transmission means, electricity generating means or a hydraulic pump in use. The transmission means or hydraulic fluid from the hydraulic pump can be used for other applications, such as for example driving electricity generating means, a turbine and/or the like.

The apparatus according to the present invention has the important advantage that it harnesses a significantly greater proportion of the wind's energy than prior art devices, thereby utilising the renewable wind source more efficiently and effectively. It does this by concentrating airflow from any direction outside towards the interior of the structure. For example, the apparatus of the present invention is at least 70-80% efficient. The rotatable means and drive shaft are housed within the interior of the support means and are therefore easier to maintain and are protected from environmental extremes. This allows the harnessing of wind energy on an industrial scale in all weather conditions. The apparatus is also quiet and flicker free. Furthermore, the hydraulic pump means, transmission means and/or electricity generating apparatus that can be provided with the apparatus can be located at or adjacent to the base of the support means rather than at the top of the support means as in the prior art, thereby making it safer and more cost effective to maintain than prior art wind turbines. The arrangement of the present invention also helps to reduce the degradation of electricity normally associated with large distances between conventional wind turbines to electricity sub-stations. Operation of the apparatus of the present invention is also significantly less effected by fluctuations in the wind available and is capable of running continuously or substantially continuously in use.

The electrical energy generated by the present invention can be transferred to a transformer that regulates electricity for transportation to the national electricity grid in one example.

Preferably the apparatus uses hydraulic fluid, movement of which is driven by the hydraulic pump means, to help generate electricity in use. This provides the apparatus with flexibility and is easy to maintain.

In one embodiment one or more cooling radiators can be integrated into the system if required to cool the hydraulic fluid.

Preferably the wind directing wall members extend outwardly along the whole or substantially the whole length/height of the upright support means (i.e. they can extend from a ground surface to a top of the upright support means or apparatus in use).

Preferably the wind directing wall members are fixed members and do not move during normal use of the apparatus and/or after assembly of the apparatus.

In one embodiment the wind directing wall members are rigid or substantially rigid members.

Preferably the wind directing wall members protrude radially outwardly from the upright support means.

In one embodiment four wind directing wall members are provided and define four wind collection sections or quadrants.

In one embodiment more than four wind directing wall members are provided, such as for example six or eight wind directing wall members can be provided to define six or eight wind collecting sections. The number of wind directing wall members is typically chosen to ensure that sufficient air pressure builds up in the wind collection sections sufficient to drive rotation of the drive shaft and rotatable means in use.

Preferably the wind directing wall members are arranged at equidistant spaced apart intervals around the periphery of the upright support means.

Preferably the provision of the plurality of wind directing wall members around 360 degrees of the upright support means allows the capture of the available wind in the external environment irrespective of the wind direction. However, the wind directing wall members could be arranged at any required angle relative to each other to provide a wind capturing area of anywhere between 0-360 degrees.

Preferably the wind directing wall members can be arranged to provide any suitable size, shape and/or design for the apparatus. For example, the apparatus can be cylindrical or substantially cylindrical in shape. However, the apparatus could be cube or cuboid, hexagonal, pentagonal, octagonal in shape and/or the like.

Preferably the distance each wind directing wall member extends outwardly from the upright support means is such so as to ensure sufficient air pressure builds up in the wind collection sections sufficient to drive rotation of the drive shaft means and rotatable means in use.

Preferably each wind directing wall member is planar or substantially planar in form. For example, each wind directing wall member can be panel like in form.

Preferably the one or more wind directing wall members and/or the upright support means are made from, consist of or include concrete and/or steel. For example, each wall can include an exoskeleton or frame with concrete or some other suitable material provided over the same to provide suitable rigidity to the wall members.

Preferably each wind collection section or quadrant has a catchment area of approximately 36,000 square feet in one example.

In one embodiment one or more dividing members are provided within each wind collection section or quadrant to divide the wind collection section between two adjacent wind directing wall members into sub-sections to provide different levels within the same. This acts to further increase the air pressure adjacent the openings defined in the upright support means and create pressure chambers. For example, the sub-sections can be arranged in a stacked arrangement one on top of the other within each wind collection section.

In one example, each wind collection section is divided into four sub-sections or levels. However, any number of sub-sections or levels could be defined as required. The number of sub-sections or levels is typically such so as to help increase the air pressure adjacent the one or more openings of the support means in use.

In one embodiment each sub-section or level is a self-contained electricity generating hub.

Preferably the sub-sections or levels in each wind collection section or quadrant are at equal or substantially equal heights to the sub-sections or levels of an adjacent wind collection section or quadrant.

Preferably the one or more dividing members are arranged transverse, perpendicular or substantially perpendicular to a longitudinal axis of the upright support means.

Preferably the one or more dividing members extend from the upright support means and between two adjacent wind directing wall members.

In one embodiment one opening is provided in each or one or more of the sub-sections. Alternatively, more than one opening can be provided in each or one or more of the sub-sections.

In one embodiment frame means and/or members can be provided with, on and/or associated with the one or more dividing members, the upright support means and/or the wind directing wall members to help support the same in use. Preferably the frame means and/or members are provided with, on and/or associated with the one or more dividing members at or adjacent a free peripheral edge of the same.

In one embodiment the frame means and/or members extend in a direction parallel or substantially parallel to the longitudinal axis of the upright support means.

In one example the frame means include one or more stanchions.

Preferably the upright support means can be any structure, frame, housing or member that can contain the drive shaft means and rotatable means in use.

Preferably the upright support means is arrange centrally or substantially centrally of the wind drive apparatus and/or wind directing wall members.

Preferably the upright support means is arranged to support at least part of the weight of the drive shaft and the rotatable means and move the load towards foundations of the apparatus.

In one example the upright support means includes a steel frame.

Preferably the upright support means helps to contain and neutralize vibrations from the drive shaft and rotatable means.

Preferably the at least one opening is provided in each wind collection section, and further preferably the at least one opening is provided in each sub-section of each wind collection section. The at least one opening helps to channel the wind, air flow and/or air pressure towards the drive shaft means and rotatable means.

In one embodiment the at least one opening is used to access the drive shaft and/or rotatable means to allow replacement and/or repair of the same.

In one embodiment closure means are provided on and/or associated with the upright support means and/or openings to allow selective closure of the or each of the at least one openings in use.

Preferably the closure means are movable between an open position, wherein air can pass through the at least one opening in use, to a closed position, wherein air is prevented from passing through the at least one opening in use. The closure means can also be moved, if required, to intermediate positions between the fully open position and the fully closed position so as to control the air flow and/or air pressure in the inner compartment of the upright support means in use. Movement of the closure means between the open and closed positions can control rotation of the drive shaft means and rotatable means in use and/or control of the hydraulic drive means, electricity generating means and/or drive transmission in use.

In one example, closing of the closure means can be used as a braking mechanism for the drive shaft and/or rotatable means of the apparatus to stop rotation of the same in use. This may be required for maintenance, repair and/or if particularly adverse weather conditions are expected.

In one example, fully opening of the closure means maximises the air pressure and/or the air flow that can be used by the apparatus to generate electricity in use.

Preferably closure means are manually and/or automatically movable between the open and closed positions in use.

In one example, the closure means is a door.

Preferably the closure means are slidably and/or pivotably movable between the open and closed positions.

Preferably movement of the closure means allows adjustment to the size of the at least one opening, thereby allowing the air flow and/or air pressure to the drive shaft to be controlled. In one example, this can allow a constant or substantially constant air flow to be created.

In one example, netting or mesh can be provided over and/or associated with the wind collection segments and/or the openings to prevent birds or other animals from entering the same in use.

In one embodiment control means or a control unit are provided to allow automated control of the closure means in use.

In one embodiment the control means or control unit are arranged to control one or more closure means at any time independently of any other closure means, or the control means can be used to control two or more or all the closure means simultaneously or substantially simultaneously.

In one embodiment drive means or a drive unit are provided to drive movement of the closure means in use.

Preferably the drive means or drive unit are any or any combination of hydraulic drive means, pneumatic means, mechanical means and/or the like. In one example, one or more hydraulic rams are used to automatically open and close the closure means in use.

In one embodiment guide means or one or more guide members are provided on and/or associated with the closure means to help guide movement of the closure means between the open and closed positions in use.

Preferably the guide means or one or more guide members includes one or more rail or track members, and further preferably at least part of the closure means is movably mounted on the one or more rail or track members.

In one example, an upper rail member and a lower rail member is provided on opposing ends of the closure means to help guide the movement of the closure means in use.

Preferably the inner compartment extends along the whole or substantially the whole length of the interior of the upright support means. The inner compartment typically houses the drive shaft means and rotatable means.

Preferably the rotatable means are in the form of one or more blades or fins that are joined to or integral with the drive shaft means.

Preferably rotation of the drive shaft means and rotatable means in use drives the hydraulic pump and/or movement of hydraulic fluid within or through the same.

Preferably the rotatable means are fixed in relation to the drive shaft means in use (i.e. the rotatable means do not undergo relative rotation with respect to the drive shaft means).

Preferably the rotatable means and/or one or more blades or fins extend outwardly, and further preferably radially outwardly, from said drive shaft means.

Preferably the drive shaft means is rotatably mounted within the inner compartment of the upright support means. Thus, in one example, the air pressure within the inner compartment causes the blade or fins and the drive shaft means to rotate in use.

Preferably the drive shaft means is arranged to rotate about a central axis or an axis that is parallel or substantially parallel to the longitudinal axis of the upright support means and/or drive shaft means.

Preferably a plurality of rotatable means and/or blades or fins are provided on the drive shaft means and are arranged at spaced apart intervals along the length of said drive shaft means.

Preferably the plurality of rotatable means and/or blades or fins can be an equidistant space apart along the length of the drive shaft means. However, the plurality of rotatable means and/or blades or fins could be arranged at different spaced distances apart from each other if required.

Preferably the plurality of rotatable means and/or blade or fins are provided in pairs or sets such that a pair or plurality of rotatable means, blades or fins protrude outwardly from each part of the drive shaft means.

In one embodiment three pairs or sets or six blades or fins are provided at each level of the drive shaft means and are arranged a spaced distance apart from each other.

Preferably the two or more rotatable means and/or blades or fins protrude outwardly from the drive shaft means in opposing directions.

In one embodiment two sets of pairs of rotatable means and/or blade or fins are provided at each part or level of the drive shaft means. Preferably the rotatable means of each pair protrude radially outwardly at opposing locations on the drive shaft means.

In one embodiment the rotatable means and/or blades or fins are integrally formed with the drive shaft means.

In one embodiment the rotatable means and/or blades or fins are joined to the drive shaft means via attachment means or attachment mechanism.

In one embodiment the attachment means or attachment mechanism includes any or any combination of one or more support arms, collars, slots, flanges, protrusions, recesses, apertures, bearings, nuts, bolts, screws, inter-engaging members, welding, adhesive and/or the like.

In one embodiment the drive shaft means comprises a plurality of drive shaft segments.

Preferably the drive shaft segments are arranged in a stacked arrangement, with one drive shaft segment on top of an adjacent drive shaft segment. This helps to distribute the weight of the drive shaft evenly or substantially evenly over the drive shaft segments and/or any bearings associated with the drive shaft segments.

Preferably one or more sets of blades or fins are provided and/or are associated with each drive shaft segment.

Preferably the drive shaft segments are arranged co-axially to each other.

Preferably each drive shaft segment is connected to an adjacent drive shaft segment via connection means or members.

Preferably the connection means or members includes male connection means provided on one end of the drive segment connectable with female connection means provided on an end of an adjacent drive segment.

Preferably the connection means is any connection mechanism that allows connection between two adjacent drive shaft segments, such as for example, one or more inter-engaging members, protruding member, recess and/or the like.

In one example, one of the male connection means or female connection means includes a protrusion which engages with the other of the male connection means or female connection means in the form of a recess.

In one embodiment each drive shaft segment includes an outwardly protruding flange associated with a body portion of the drive shaft segment.

Preferably the flange sits on a bearing defined within the interior of the drive shaft compartment in use.

Preferably each drive shaft segment includes a body portion with the rotatable means and/or blades or fins protruding outwardly from each drive shaft segment body portion.

In one embodiment each wind directing wall member or each quadrant wall is attached directly or indirectly to a bearing housing in which a bearing is defined.

Thus, in one example, each wind directing wall member or quadrant wall is provided with drive shaft support means that extend inwardly or radially inwardly of the upright support means into the interior compartment to support at least part of the drive shaft directly or indirectly in use.

Preferably the drive shaft support means engages with the bearing housing, a drive shaft segment frame means, a collar of the drive shaft segment and/or a collar supporting the bearing and/or bearing housing in use.

In one example, the inwardly extending drive shaft support means are in the form of one or more support arms.

In one embodiment the bearing housing, bearing and/or collar are provided in segments that are joined together around the body portion of each drive shaft segment in use.

Preferably the drive shaft segments and associated blades or fins are of modular construction so that multiple segments can be joined together. This allows standard parts to be used multiple times, thereby reducing manufacturing costs and increasing the ease of maintenance.

In one embodiment one level within the modular construction can be disassembled while others can operate. This allows replacement and repair to take place if required.

In one embodiment the apparatus includes electricity generating means or plant, hydraulic pump means and/or drive transmission means or device.

In one embodiment one end of the drive shaft means or segment is provided in, connected with and/or associated with the transmission means or hydraulic pump means.

Preferably rotation of the drive shaft means and blades or fins drives the transmission means or hydraulic pump means in use. For example, rotational forces generated by rotation of the drive shaft and blades are used to move hydraulic fluid associated with the hydraulic pump means. This can be done at high torque.

Preferably a first lower end of the drive shaft is provided in, connected with and/or associated with the transmission means or hydraulic pump means.

Preferably the transmission means, electricity generating means or hydraulic pump means are provided at or adjacent a base of the apparatus. This ensures that the weight, or at least a major part of the weight, of these components are provided at the base of the apparatus rather than at the top of the apparatus and are easier to assemble, repair and/or maintain.

Preferably the transmission means, electricity generating means or hydraulic pump means are housed in a housing or building at the base of the apparatus. This housing or building can be above ground, underground or partially underground if required.

In one embodiment one or more compartments are arranged around the hydraulic pump and contain an electricity generating means or plant or a transformer. In one example, four separate compartments are provided.

In one embodiment cooling means are provided to cool one or more components of the drive shaft means, hydraulic pump means, transmission means, hydraulic fluid used in the hydraulic pump means, other components of the apparatus and/or the like.

In one example, the cooling means includes one or more oil cooling radiators.

Preferably the one or more oil cooling radiators are located in the interior compartment, and further preferably in the interior compartment adjacent a base of the upright support means.

Preferably the oil cooling radiators are provided around and/or adjacent to the peripheral edge of the interior compartment of the upright support means.

Preferably one or more hydraulic conduits or inlet conduits are connected to the hydraulic pump means to provide hydraulic fluid to the pump means in use.

Preferably one or more fluid or oil conduits are connected to the hydraulic pump means and/or transmission means to provide fluid or oil to the hydraulic pump means and/or transmission means. Further preferably the fluid or oil conduits are high pressure fluid or oil conduits.

In one embodiment a further pump or hydraulic pump means is provided to help cool the fluid or oil used in the hydraulic pump means.

In one embodiment the hydraulic pump means and/or transmission means are connectable to valve means or a valve unit in use.

Preferably pressure flow produced by the hydraulic pump means is distributed by the valve unit to one or more electricity generating plants. In one example, the pressure flow produced by the hydraulic pump means is distributed by the valve unit to one or more hydraulic drive motors which in turn drive one or more electricity generating motors.

Preferably the number of electricity generating plants in use at any one time is variable depending on the wind velocity.

Preferably the valve means or unit is in the form of a valve block. A plurality of valve units or blocks could be provided if required.

Preferably electricity generating means are connectable to the valve unit or block in use.

Preferably the electricity generation means includes one or more turbines, electricity generating units and/or the like.

Preferably the valve means or unit can be controlled by control means to control the fluid input to the valve unit, the fluid output from the valve unit and/or hydraulic pressure fed to the electricity generation means from the valve unit in use. In this manner, electricity generation apparatus can be brought on line or taken off line via the control means depending on the electricity demand, the weather conditions and/or the like. This can be done manually and/or automatically as required.

Preferably hydraulic fluid within one or more conduits connected to the hydraulic pump means is fed to the valve means or unit in use.

In one example, the transmission means or unit drives one or more hydraulic pump means in use.

Preferably the apparatus is provided with foundation means, and further preferably the foundation means extends under the ground surface on which the apparatus is located in use to provide strength and rigidity to the apparatus.

In one embodiment control means are provided to control one or more parameters and/or components of the wind driven apparatus and/or the electricity generating apparatus in use. For example, the control means can be used to control the opening and closing of the closure means; illumination of the apparatus via illumination means; one or more sensor means provided on and/or associated with the apparatus, such as wind speed sensors, weather sensors and/or the like; one or more image capturing means, such as one or more cameras, video cameras and/or the like; control the valve block or unit; control the cooling means; control the electricity generating means and/or the like.

Preferably the control means is in the form of an electronic control unit, micro-processing means, one or more computers, software and/or the like.

In one embodiment lubricating means can be provided on and/or associated with any or any combination of components of the wind driven apparatus. For example, an automatic lubrication system can be provided with one or more bearings of the apparatus to ensure lubrication of the same to increase the longevity of the system.

In one embodiment maintenance means are provided on and/or associated with the wind drive apparatus. The maintenance means preferably include any or any combination of one or more lifts, winches, overhead cranes, ladders, movable cages and/or the like.

Preferably air exhaust means are provided in and/or associated with the wind drive apparatus to allow venting or exhausting of air from the inner compartment to the exterior of the apparatus is required.

Preferably the air exhaust means includes one or more outlet apertures and/or the like.

In one embodiment the walls of the upright support means defining the one or more openings have a narrowing taper from the wind collection section side to the interior compartment side. This helps to further increase the air pressure entering the inner compartment of the upright support means.

Preferably reference to wind is the flow of air in the external environment (i.e. external to the apparatus).

According to a second aspect of the present invention there is provided a method of using wind driven apparatus, said wind driven apparatus including upright support means, a plurality of wind directing wall members protruding outwardly from the upright support means at spaced apart intervals, the area between two adjacent wind directing wall members creating a wind collection section, and wherein said method includes the steps of collecting and directing wind into the wind collection section, directing the wind, air and/or air pressure collected in the wind collection section through at least one opening defined in the upright support means in each wind collection section and into an inner compartment defined in the upright support means, using the wind, air and/or air pressure to drive rotation of drive shaft means and rotatable means provided on and/or associated with the drive shaft means and located in the inner compartment of the upright support means, and wherein rotation of the drive shaft means can then be used to drive electricity generating means, hydraulic pump means and/or drive transmission means in use.

According to a third aspect of the present invention there is provided electricity generating apparatus, said electricity generating apparatus including:

wind drive apparatus, said wind drive apparatus including upright support means, a plurality of wind directing wall members protruding outwardly from the upright support means at spaced apart intervals around the upright support means, the area between two adjacent wind directing wall members creating a wind collection section for collecting and directing wind in use, at least one opening defined in the upright support means in each wind collection section for allowing wind collected in the wind collection section to pass through said openings and into an inner compartment defined in the upright support means, a drive shaft provided in the inner compartment of the support means and rotatable means provided on and/or associated with said drive shaft, the rotatable means rotatable by air flowing into the inner compartment via said openings and arranged to cause rotation of the drive shaft in use, and wherein the drive shaft is arranged to drive hydraulic pump means and/or drive transmission means in use, said hydraulic pump means and/or drive transmission used to drive one or more electricity generation means in use.

Preferably the one or more electricity generation means includes any or any combination of one or more turbines, electricity generation devices and/or the like.

Preferably the hydraulic pump means and/or drive transmission means is connected to the one or more electricity generation means via a valve unit.

Preferably one or more hydraulic conduits are provided between the hydraulic pump means and/or drive transmission means for the flow of hydraulic fluid therealong in use.

In one embodiment the drive transmission means is in the form of or includes a gearbox.

According to a further aspect of the present invention there is provided a method of using electricity generating apparatus.

Embodiments of the present invention will now be described with reference to the following figures, wherein.

It will be appreciated that any or any combination of features shown in the different figures and embodiments can be combined together and still fall within the scope of the present invention.

Figure 1:
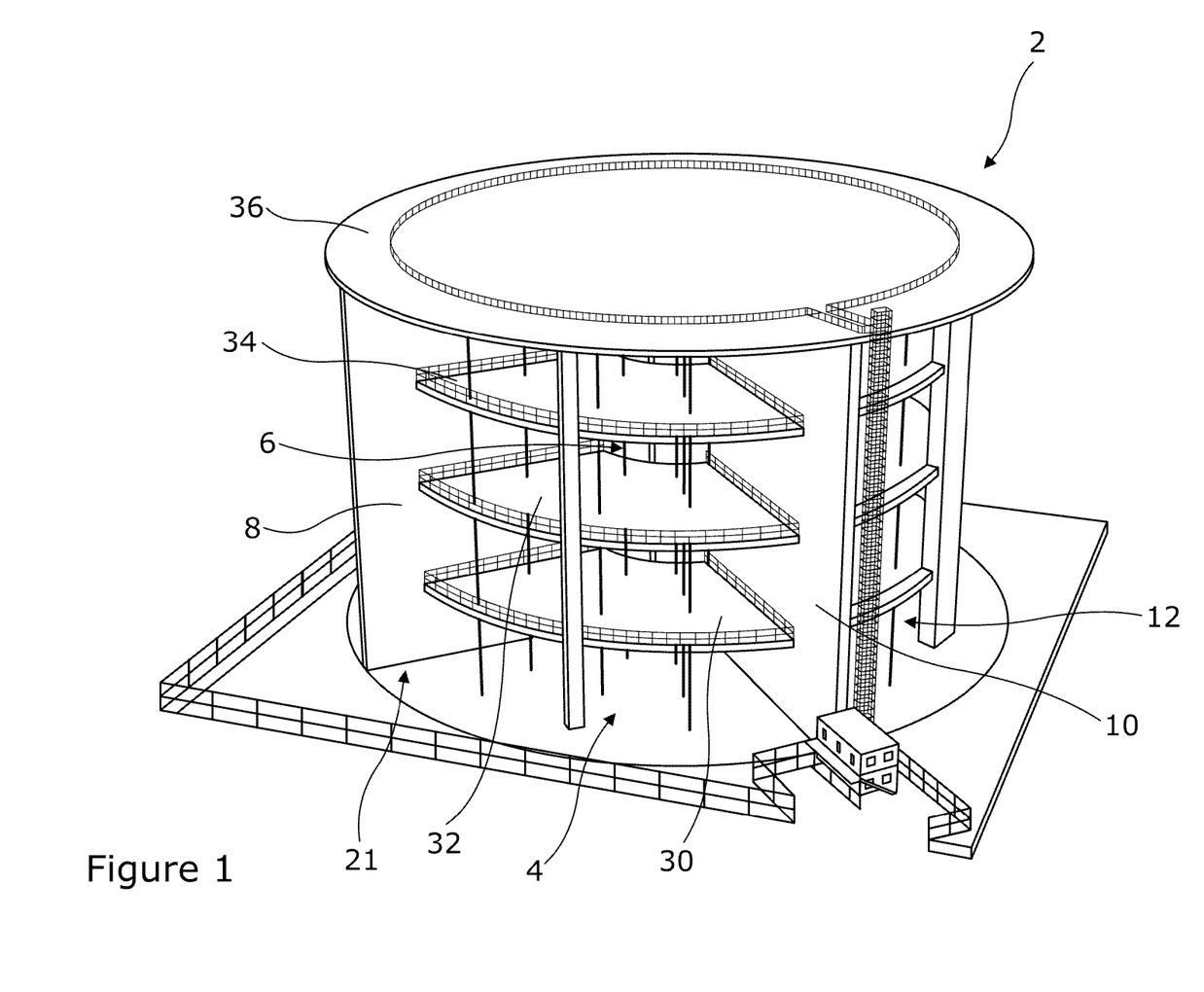
FIG. 1 is a perspective view of wind driven apparatus according to an embodiment of the present invention.

Referring firstly to FIG. 1, there is illustrated a perspective view of wind driven electricity generating apparatus 2 according to an embodiment of the present invention. The wind driven apparatus 2 includes an upright central support means in the form of support tower 6. Four wind directing wall members protrude radially outwardly from support tower 6 in the form of quadrant walls 8, 10 (only two of which are shown in FIG. 1 for clarity purposes). Each quadrant wall 8, 10 is planar, fixed and extends outwardly along the whole or substantially the whole length/height of support tower 6. Each quadrant wall 8, 10 is in contact with the ground at or adjacent a base edge 21 thereof. Each quadrant wall 8, 10 can be protruding, or at least partially protruding underground, to provide a secure foundation and structural support of the apparatus in use.

The four quadrant wall members 8, 10 define four wind collection sections or quadrants 4, 12 (only two of which are shown for clarity purposes). These quadrants are designed to collect and direct wind and air pressure in use towards openings 22 defined along the length of the support tower 6. Since the quadrants in this example are provided 360 degrees around the support tower 6, they will capture the wind irrespective of the direction of the wind.

In order to contain the air pressure that builds up adjacent the openings 22 within each quadrant 4, 12 to form a pressure chamber, quadrant dividing members 30, 32, 34, 36 are provided to divide each quadrant into four sub-sections or levels. Each dividing member 30-36 protrudes outwardly from the support tower 6 between the adjacent quadrant walls 8, 10 and is perpendicular to the longitudinal axis of the support tower 6. The top dividing member 36 of each quadrant forms a ceiling to the quadrant. The lower dividing members 30, 32,34 provide floors or levels within the quadrants which can be used to help access and maintain the quadrants and/or doors 41 in use.

Frame means in the form of upright frame members 38 are provided to support the dividing members in use. In the illustrated example, a plurality of frame members or stanchions 38 are provided for supporting each of the dividing members 30, 32, 34, 36. The stanchions 38 are arranged parallel to the support tower 6 and a spaced distance apart from each other.

Each sub-section of each quadrant 4, 12 can have a single opening 22 or can have more than one opening as required.

Figure 2A:
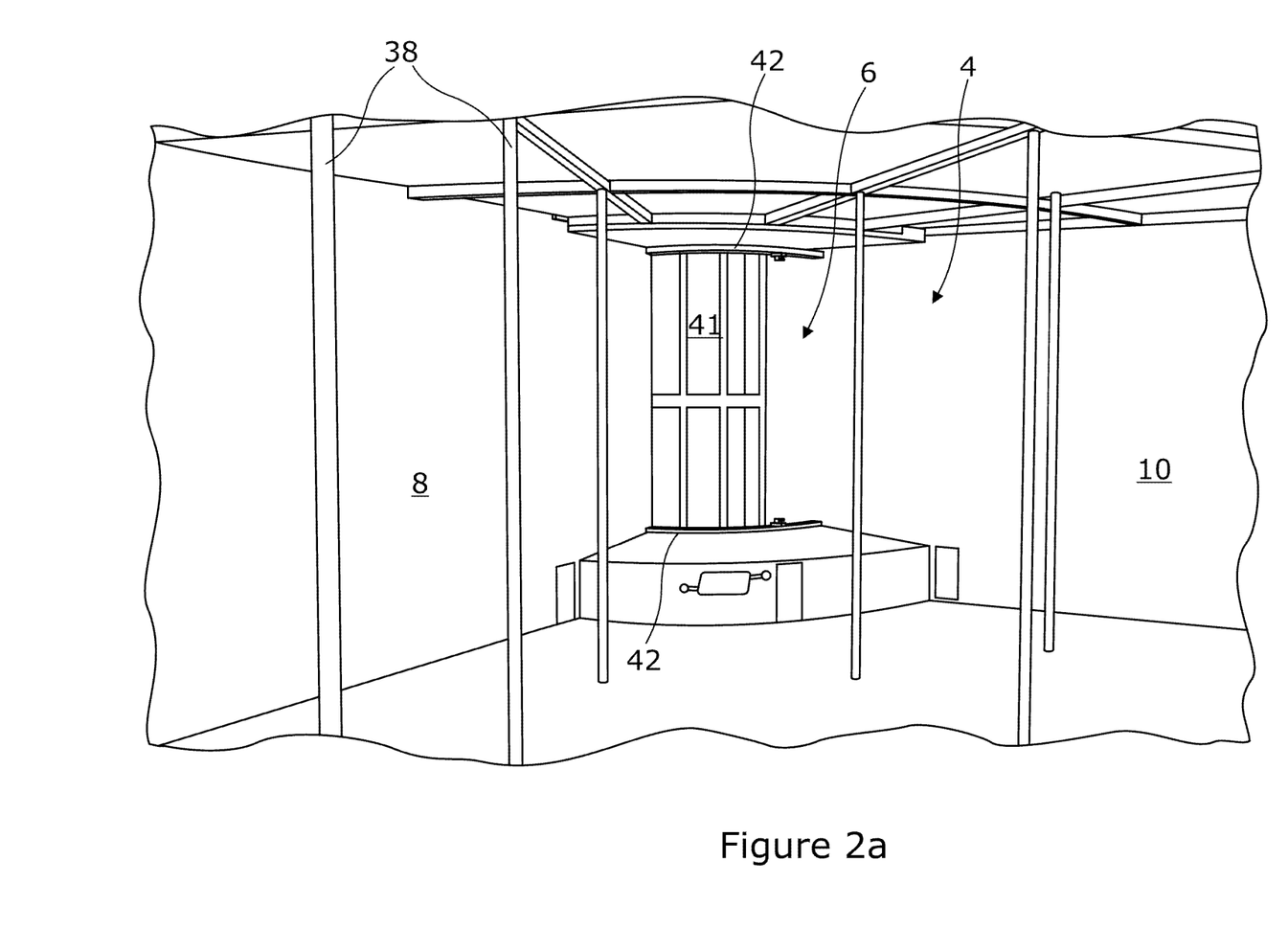
FIGS. 2a and 2b show detailed views of part of a wind collection section of the apparatus showing the closure means of the upright support means in a closed position and an open position respectively.

Closure means in the form of doors 41 are associated with each opening 22 on the support tower 6 to allow selective closure of the openings in use. More particularly, the doors 41 are movable between a fully open position (FIG. 2b only shows the doors 41 in a partially open position) wherein air can flow through the opening 22, and a fully closed position, as shown in FIG. 2a, wherein air is prevented from flowing through opening 22. The doors 41 can also optionally be controlled to open and close partially in one or more intermediate positions to vary the air flow through the same in use.

Figure 2B:
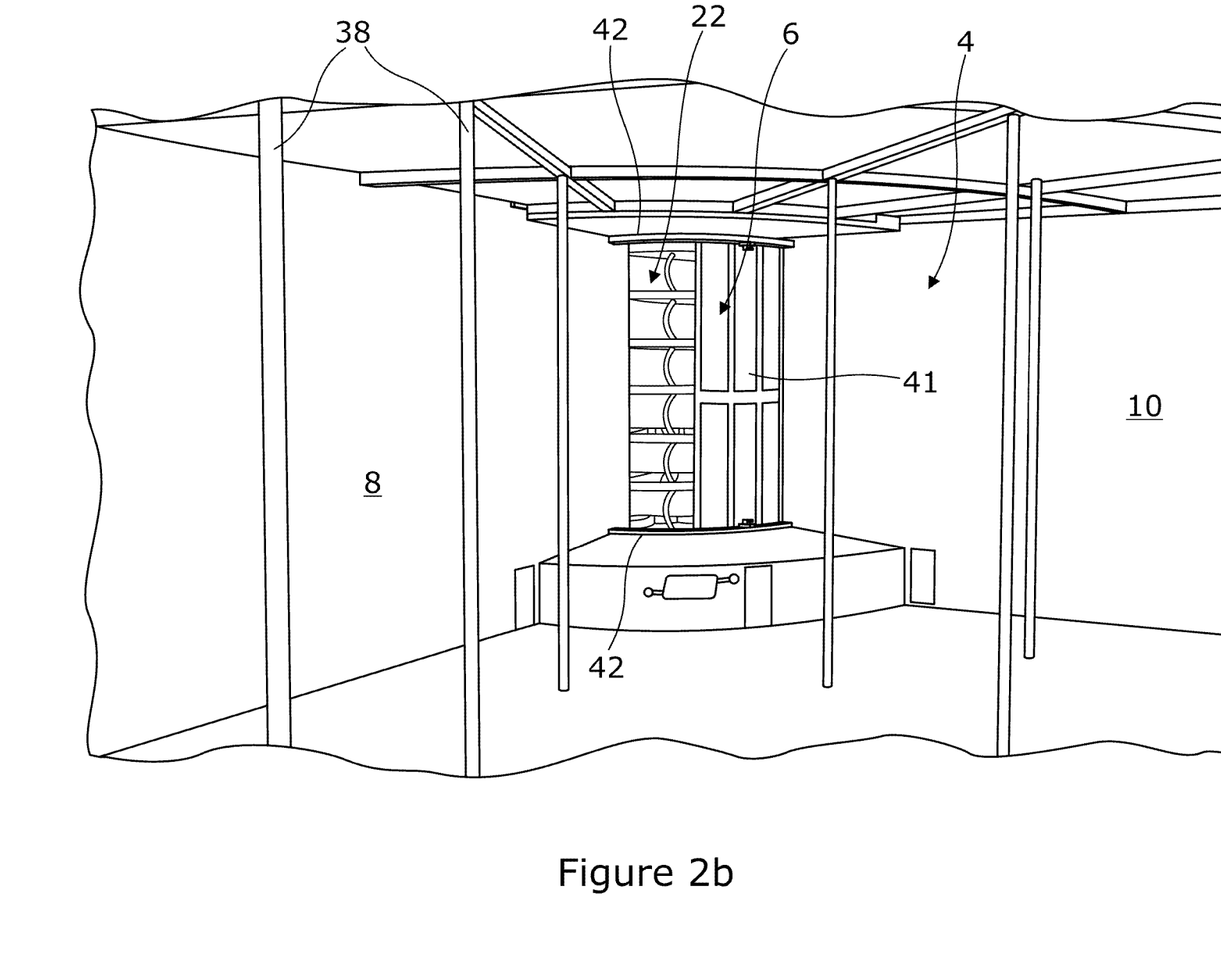

Guide means in the form of upper and lower guide rails 42 are provided at opposing ends of the openings 22 to guide the movement of the doors 41 between the open and closed position in use. The doors 41 are typically movably mounted on the guide rails 42.

Drive means or a drive mechanism can be provided to drive the movement of the doors 41 between the open and closed position in use. In one example, the drive means allows the doors to slidably move between the open and closed positions. In an alternative example, drive means are provided to allow pivotal movement of the doors between the open and closed positions. The drive means or mechanism can include one or more motors, gearing and/or the like to drive the movement of the doors in use in one example. One or more hydraulic rams could be arranged to move between a relatively extended position and a relatively retracted position in moving the doors 41 between the closed position and the open position respectively in another example.

The support tower 6 is hollow and defines an interior compartment 46 therein. The interior compartment 46 extends the length of the support tower 6 and houses a drive shaft 48 that also extends the length, or majority of the length, of the support tower 6. The openings 22 open into the interior compartment 46 or drive shaft compartment.

Figure 4:
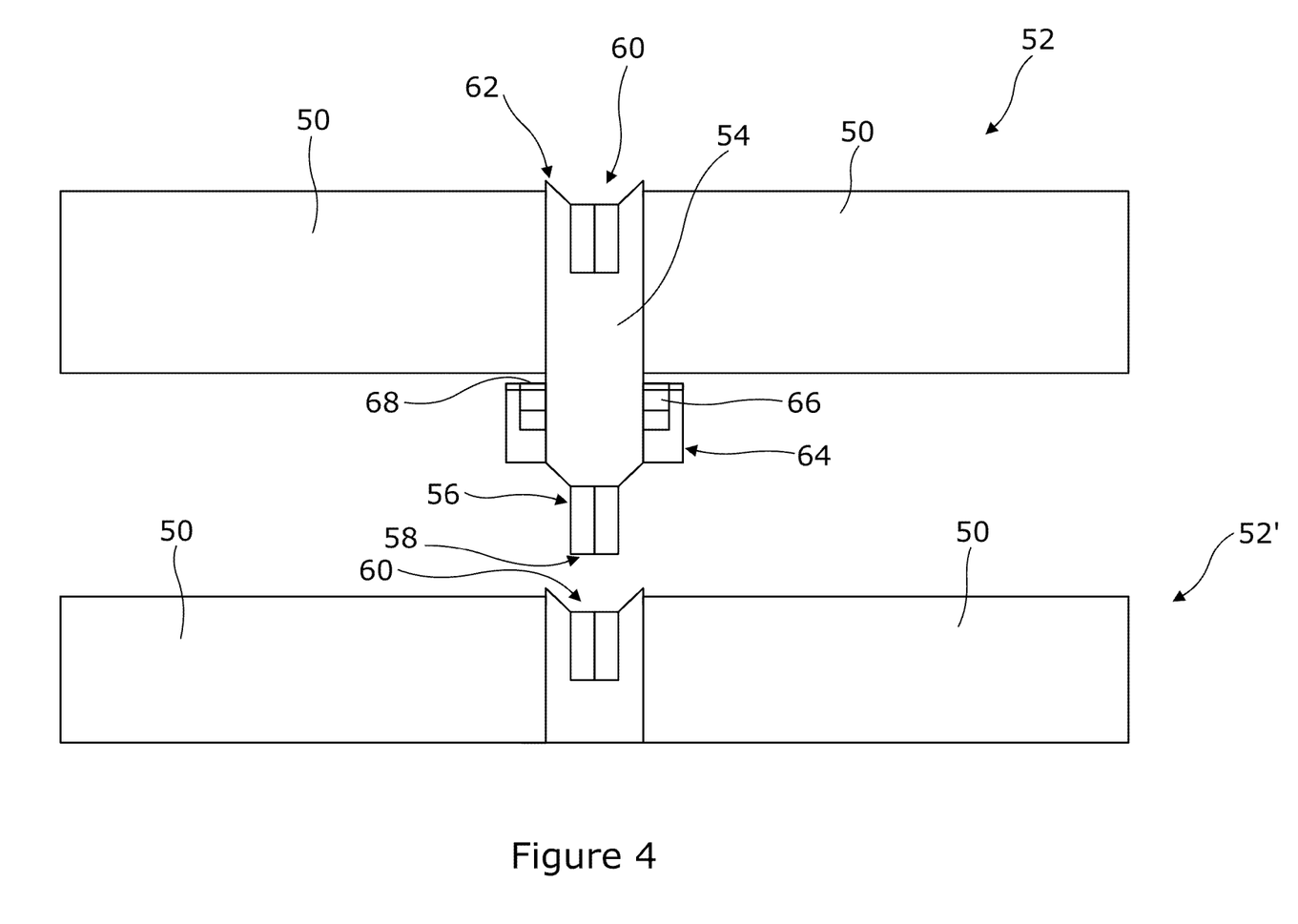
FIG. 4 is a cross sectional view taken through a drive shaft segment with a partial view of an adjacent drive shaft segment to show how they engage together in use according to one embodiment.
Figure 5:
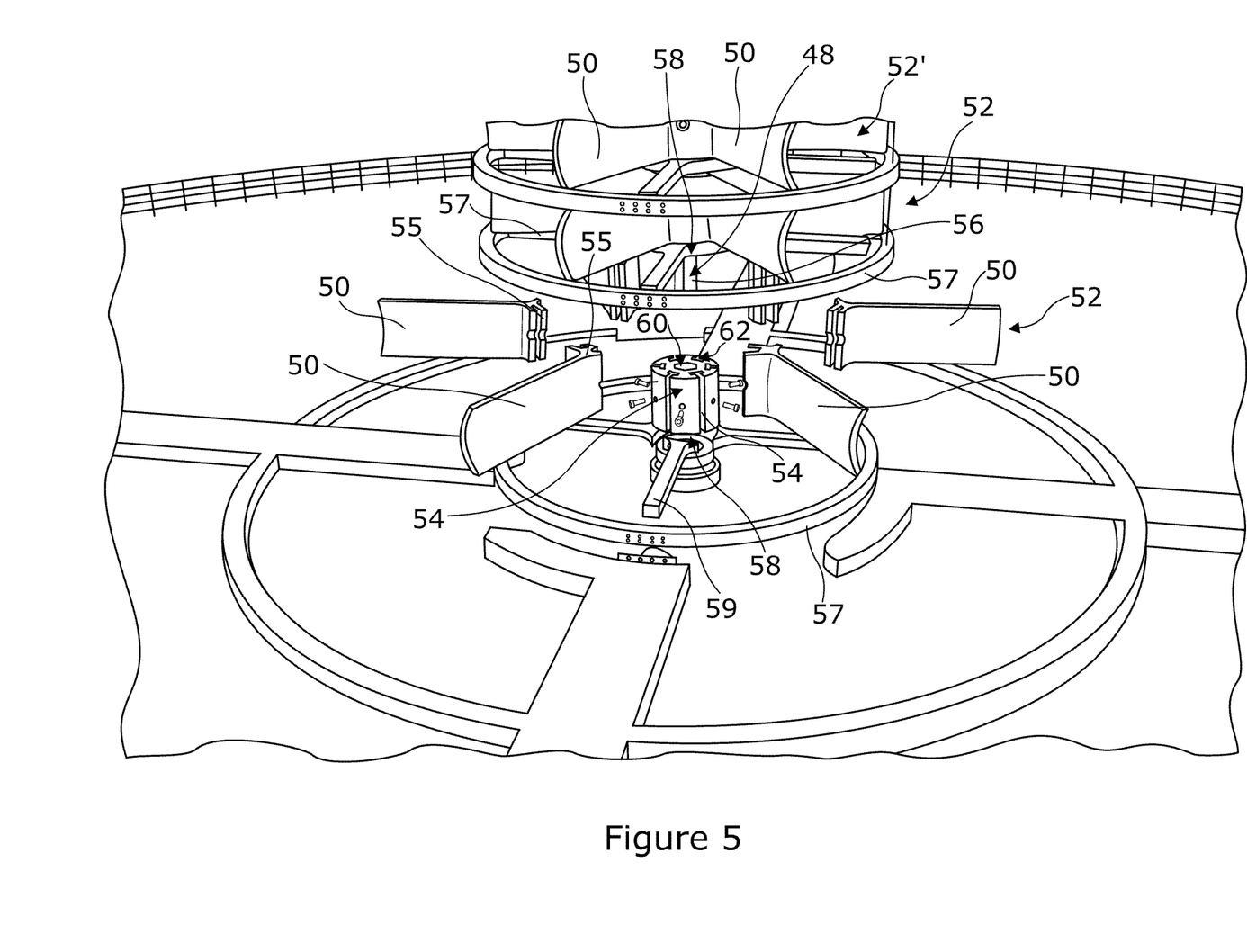
FIG. 5 is a partially exploded perspective view showing the components of a drive shaft segment according to a further embodiment.

Rotatable means in the form of a plurality fins or blades 50 are integrally formed, attached or detachably attached to the drive shaft 48 and extend radially outwardly therefrom. FIG. 4 shows an embodiment of the present invention where the blades 50 are integrally formed with the drive shaft 48 (or drive shaft segment 52). FIG. 5 shows an embodiment of the present invention where the blades 50 are detachably attached to a drive shaft segment 52.

The drive shaft 48 with the blades 50 is capable of rotating about a central axis 'X', that is parallel to the longitudinal axis of the support tower 6, in use.

Figure 3:
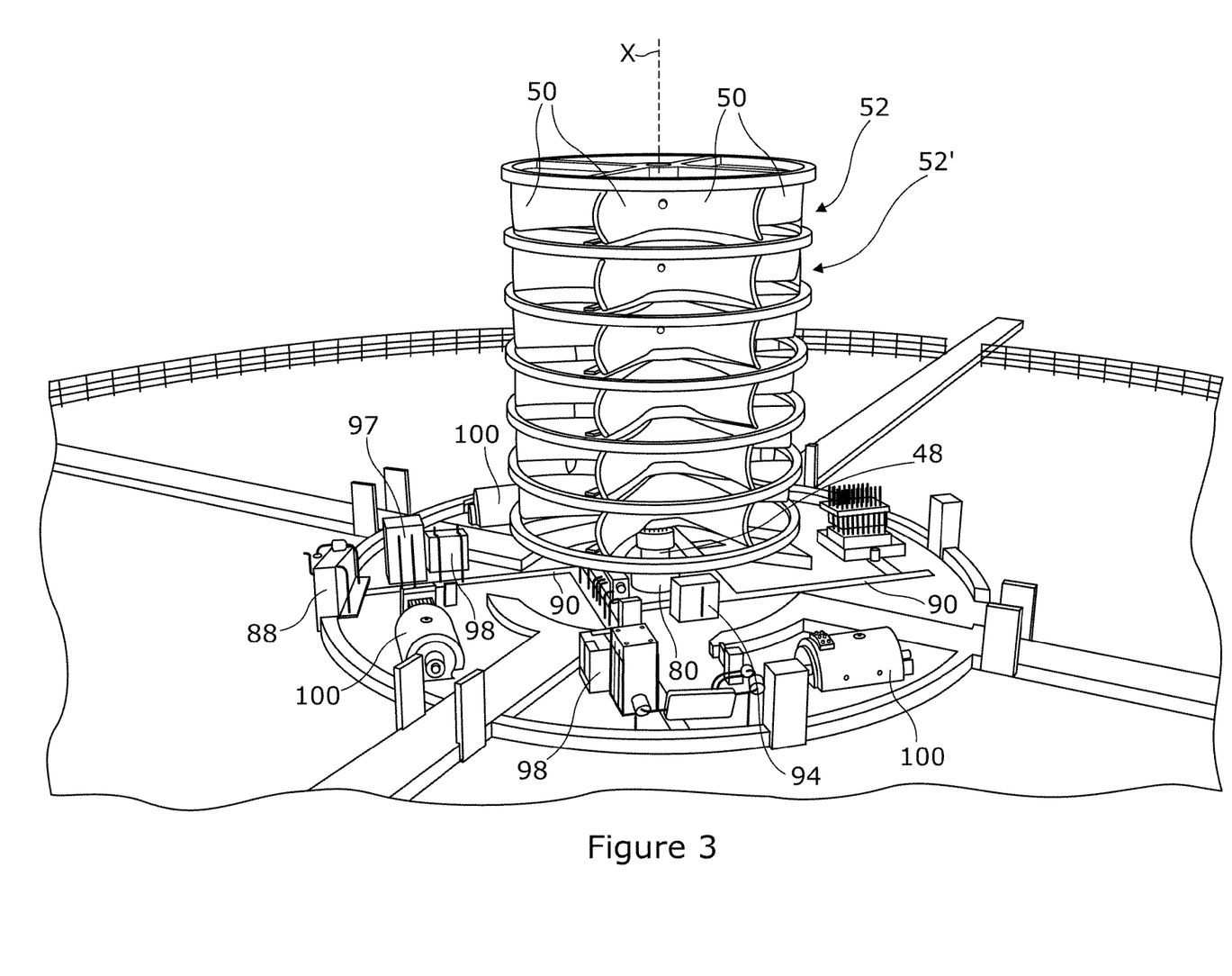
FIG. 3 is a perspective view of part of the wind driven apparatus showing the components within the upright support means, the electricity generating means, hydraulic pump means and the drive transmission means.

The drive shaft 48 in one embodiment is divided into a plurality of drive shaft segments 52 that are arranged in a stacked arrangement with one drive shaft segment 52 arranged on top of an adjacent drive shaft segment 52', as shown in FIG. 3.

More particularly, the blades 50 extend radially outwardly from a body portion 54 of each drive shaft segment 52. More or fewer blades 50 could be provided as required and could be arranged at any spaced apart arrangement around said body portion 54. In one example, two pairs of opposing blades can be provided at equidistant spaces around the body portion 54. In another example, as shown in FIG. 5, six blades 50 are provided at equidistance spaces around the body portion 54.

Connection means are provided on each drive shaft segment 52 in the form of a male shaft connection 56 provided at a first end 58 of each drive shaft segment and a female shaft connection 60 provided at a second end 62 of each drive shaft segment.

In FIGS. 4 and 5, the male shaft connection 56 is in the form of a protrusion member and the female shaft connection 60 is in the form of a recess. The drive shaft segments are identical in form and the male shaft connection 56 engages in the female shaft connection 60 of an adjacent drive shaft segment 52'.

In FIG. 4, in one embodiment, each drive shaft segment 52 includes an outwardly protruding flange 70 around the body portion 54. The flange 70 of the drive shaft segment 52 sits on a bearing 66, which in turn is located on a collar 64 provided around the body portion 54 adjacent the male shaft connection 56. The collar 64 houses a bearing 66. A cover 68 can be provided over the bearing 66 to prevent dirt and debris from getting into the bearing in use.

Figure 6:
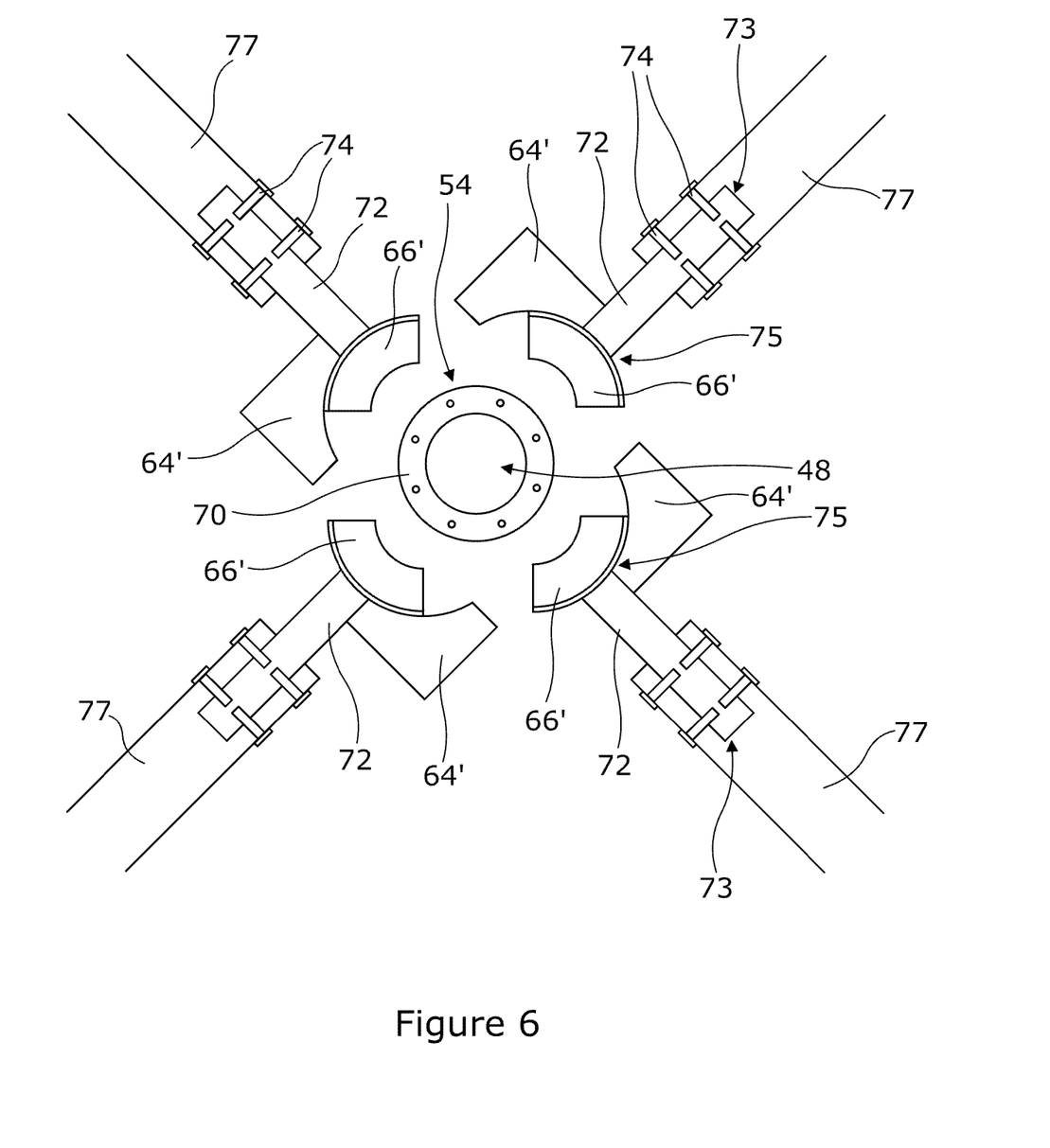
FIG. 6 is a partially exploded view of part of the drive shaft and shows how supporting arms associated with the quadrant walls join to each drive shaft segment bearings in one embodiment.

In one embodiment, the bearing 66 and the collar 64 are each provided in four segments; bearing segments 66' and collar segments 64' respectively, as shown in FIG. 6, that are engaged together when the apparatus is assembled in use.

Each quadrant wall 8, 10 is indirectly attached to each drive shaft segment 52 to support the weight of the drive shaft segment 52 and to provide strength and rigidity to the apparatus. More particularly, each quadrant wall is provided with a plurality of inwardly protruding support arms 72 that protrude inwardly of the support tower 6 and into the interior compartment 46. These support arms 72 are typically bolted to an inner quadrant wall reinforcement structure or exoskeleton 77 (that is located within each of the quadrant walls 8, 10) by bolts 74 at a first end 73 of the support arm 72. The opposite end 75 of support arm 72 is joined to one of the collar segments 64'. The inner quadrant wall reinforcement structure 77 typically extends the width and height of each quadrant wall in one example. The reinforcement structure 77 is typically then encased in concrete to form the quadrant wall structures 8, 10 to provide weight and stability to the structure.

Each collar segment can be provided as a collar segment pair including part A and Part B. The paired arrangement provides the apparatus with enhanced strength and rigidity.

In one example, 32 drive shaft segments are provided to form the upright drive shaft running through the support tower 6. However, any number of drive shaft segments can be provided as required to form the upright drive shaft.

In FIG. 5, in a further embodiment, the body portion 54 is in the form of a collar with slots 53 defined around the external circumference of the same. Each slot 53 is parallel to a longitudinal axis of the drive shaft. An end of each blade is provided with a flange element 55 that slidably engages within the slots 53 to secure the same in position in use. Further securing means, such as nuts and bolts for example, can be used to further secure the blades with the body portion 54. Each drive shaft segment engages with an adjacent drive shaft segment to spread the load of the drive shaft.

Each drive shaft segment 52 is also provided with a support frame including an annular outer frame 57, and radial bracing members 59 between the male shaft connection 56 and the annular outer frame 57. The support frame provides strength and rigidity to each drive shaft segment. The quadrant walls of the wind collection sections, or a support frame or exoskeleton within each quadrant wall, can be connected to the annular outer frame 57 and/or radial bracing members to increase the strength and rigidity of the structure if required.

Figure 7:
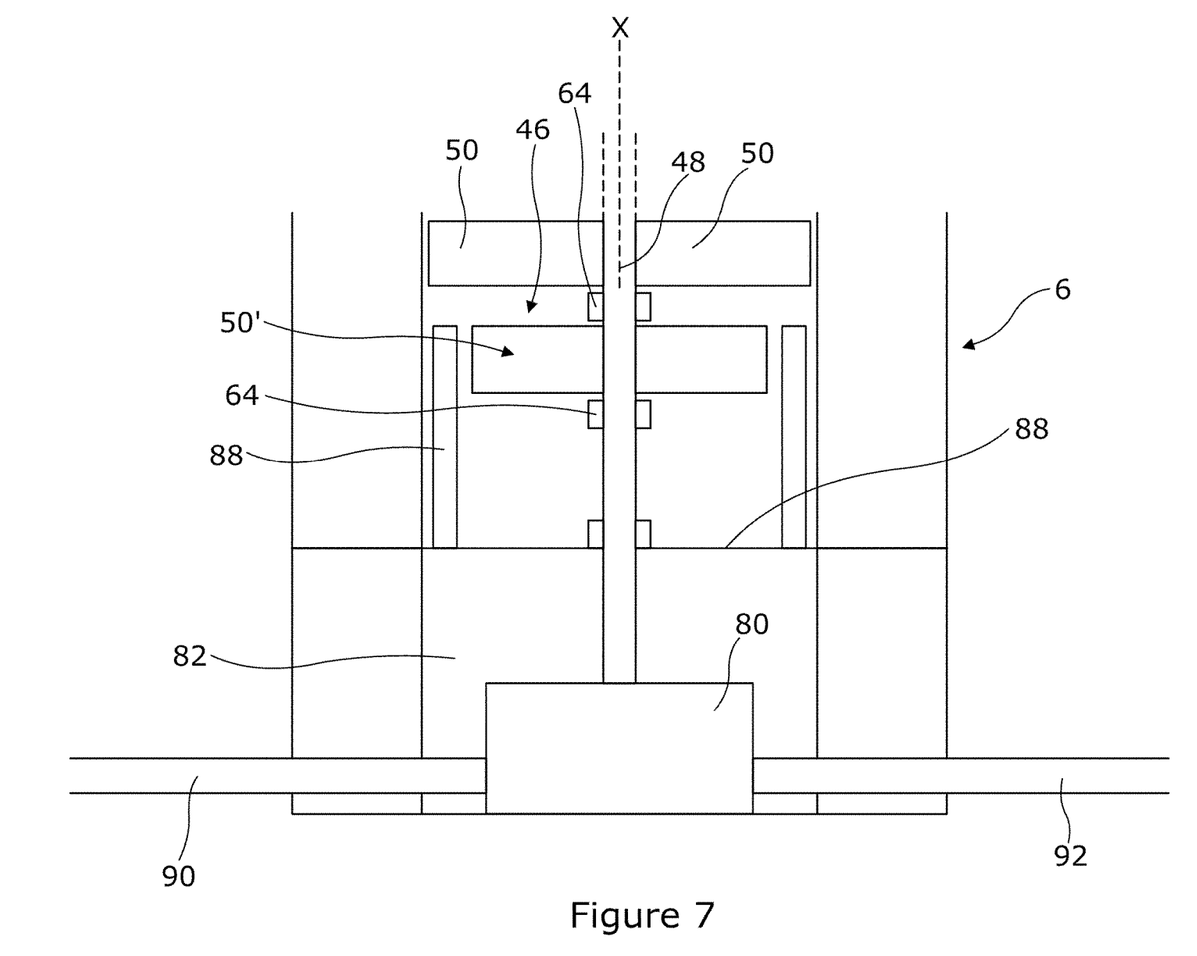
FIG. 7 is a more detailed view of a base of the drive shaft showing the connection with hydraulic pump means and/or transmission means according to an embodiment of the present invention.

FIGS. 3 and 7 show examples of how the drive shaft 48 can be connected with hydraulic pump 80 and/or a drive transmission provided at the base of the apparatus. The blades 50' in FIG. 8 nearest to the hydraulic pump can be shorter in length compared to the remaining blades 50 if required to allow for accommodation of oil cooling radiators 88. Alternatively, cooling radiators 88 can be located a spaced distance from the central support tower 6. Other cooling means could be provided to cool the hydraulic fluid if required.

In the embodiment in FIG. 7, a hydraulic inflow pipe 90 is connection to the hydraulic pump 80 to provide hydraulic fluid to the pump 80. A high pressure hydraulic fluid (oil in one example) outlet pipe 92 is connected to hydraulic pump 80 to provide hydraulic fluid to a valve block 94. However, as shown in FIG. 3, conduits 90 can be provided to carry hydraulic fluid in any required direction between the hydraulic pump 80, one or more valve blocks 94, one or more oil or hydraulic fluid supply tanks 98, hydraulic fluid filtration device 97 and/or the like.

Figure 8:
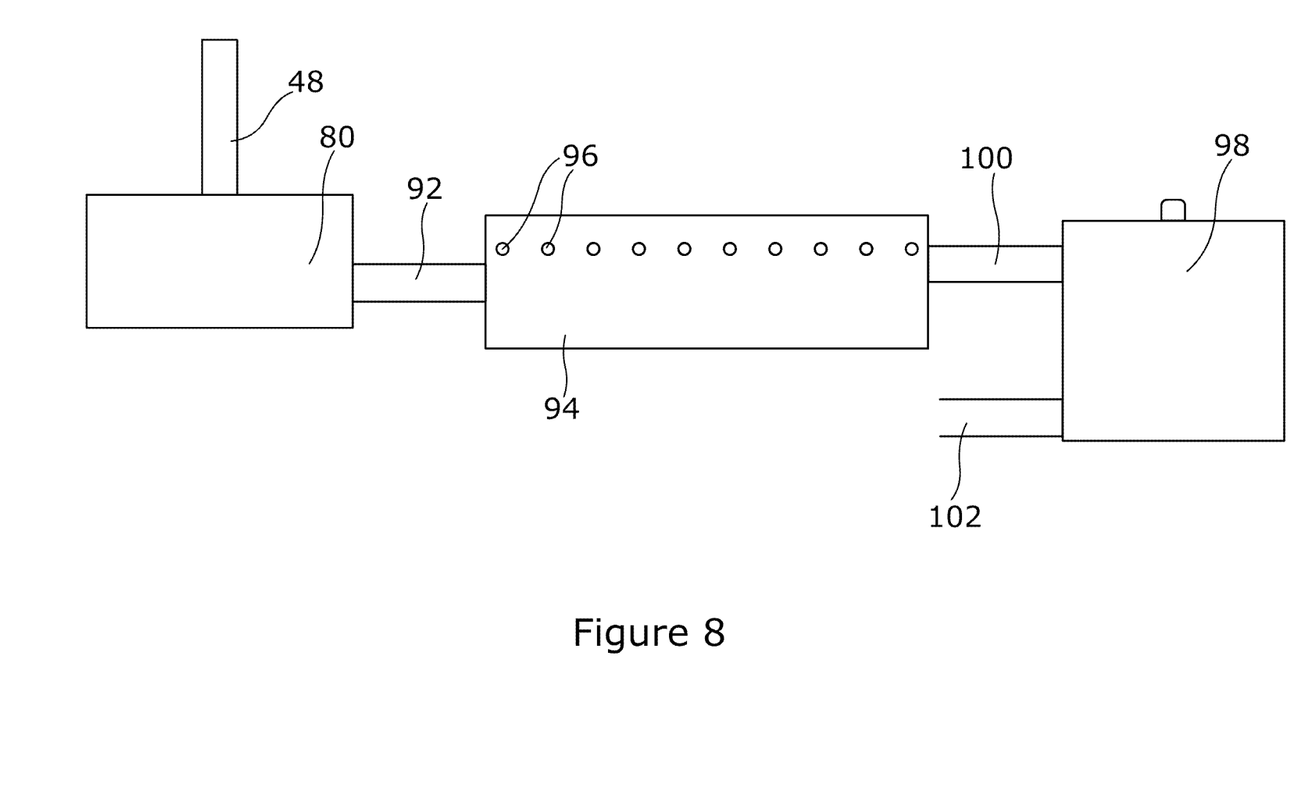
FIG. 8 is a simplified view of a valve block that can be used with the hydraulic pump means and/or transmission means according to an embodiment of the present invention.

FIG. 8 shows how the hydraulic pump 80 and/or drive transmission can be connected to electricity generating apparatus 100 in one embodiment. More particularly, a valve unit in the form of a valve block 94 is connected to the hydraulic pump 80 and/or drive transmission via high pressure hydraulic fluid pipe 92. The valve block 94 is connectable to one or more electrical generator means or turbines 100 via delivery conduits 96 extending outwardly from valve block 94.

The valve block 94 is connectable to a hydraulic oil tank 98 via a conduit or an overpressure return conduit 100 to provide hydraulic fluid to the system. A conduit 102 joins the hydraulic oil tank 98 to main hydraulic pump 80 and/or drive transmission to provide hydraulic fluid to the same in use. Conduit 102 can join inflow pipe 90.

In one example of the wind drive apparatus, the drive shaft 48 is 45.7 m tall (150 feet). Each blade 50 of the drive shaft 48 radiates outwardly by 2.4 m (8 feet). The radius of each quadrant from the central tower 6 is 45.7 m (150 feet), giving the overall diameter of the apparatus at over 90 m (300 feet). Each quadrant provides a wind capture area of 2856.7 square metre (30750 square feet). The captured wind is funneled to the drive shaft chamber, causing a back pressure, since the drive shaft chamber only allows air flow access of 69.68 square metres (750 square feet). The result is that the quadrant becomes a pressure chamber.

The blade capture capacity is 283.17 square metre (3048 square feet) to the driven shaft 48 and, depending on the wind speed, can achieve 27116.36 Nm (20,000 foot/pounds)–135581.8 Nm (100,000 foot/pounds) of torque. The dimensions of the components of the wind drive apparatus can be up sized or downsized depending on the application and requirements of the apparatus as required.

It will be appreciated that the forces applied to the wind drive apparatus of the present invention will vary significantly depending on the wind available, the location in which the apparatus is placed, the size of the apparatus and/or the like. The components of the apparatus will typically be chosen according to the forces the components will need to withstand in use. For example, the fins could be formed from titanium as it is a strong material which is also very light. However, other materials, such as metal, steel could be used as required.

In assembling the wind drive apparatus, it will be appreciated that each drive shaft segment can be lowered into place to form a stack to create the complete drive shaft. An overhead crane could be used to perform this task in one example. In addition, the dividing members could be formed of such material and with such strength and rigidity to allow vehicles to drive on the same to help with the assembly work.

Maintenance means could be provided on and/or associated with the apparatus to allow maintenance, assembly and/or repair of the apparatus in use. In one example, maintenance means in the form of a service cage can be provided. The service cage can be movable within the drive shaft chamber along the length/height of the drive shaft chamber. A winch cable can be attached to the cage via a support bar that can be used to move the same within the drive shaft chamber. An opposite end of the winch cable can be attached to an overhead winch crane provided at the top of the support tower to help with maintenance and assembly of the apparatus in use. The cage can typically be of such shape to fit between adjacent blades 50 in the drive shaft chamber, such as for example, a quadrant shape. Extendable and retractable arm members could be provided on the base of the cage to allow the same to be supported between two adjacent blades 50 in use.

Movement means, such as for example, one or more stabilising wheels can be provided on an exterior facing peripheral edge of the cage to help stabilise and guide the cage as it moves within the interior drive shaft compartment in use. The wheels can also help to prevent drift of the cage in use.

Due to the modular nature of the drive shaft segments, it will be appreciated that the components of each segment can be disassembled and reassembled without requiring the entire drive shaft the be taken apart.

The invention claimed is:

1. A wind driven apparatus, said wind driven apparatus including an upright support means, a plurality of wind directing wall members protruding outwardly from the upright support means at spaced apart intervals, the area between two adjacent wind directing wall members creating a wind collection section for collecting and directing wind, at least one opening defined in the upright support means in each wind collection section for allowing wind and/or air collected in the wind collection section to pass through said at least one opening and into an inner compartment defined in the upright support means, a drive shaft means provided in the inner compartment of the upright support means and a rotatable means joined to, fixed relative to, or integral with the drive shaft means, the drive shaft means and rotatable means are rotatable in use as a result of wind and/or air flowing into the inner compartment via said at least one opening, wherein the drive shaft means comprises a plurality of drive shaft segments arranged in a stacked arrangement, with one drive shaft segment arranged on top of an adjacent drive shaft segment; the stacked arrangement distributing the weight of the drive shaft means evenly or substantially evenly, over the plurality of drive shaft segments, thereby reducing the torque required to initiate rotation of the drive shaft means, and allowing the drive shaft means to rotate at lower wind speeds; and said wind driven apparatus including a hydraulic pump means which is arranged such that rotation of the drive shaft means is used to drive the hydraulic pump means.

2. The wind driven apparatus according to claim 1, wherein the wind directing wall members are fixed, rigid, or substantially rigid and extend radially outwardly from the upright support means.

3. The wind driven apparatus according to claim 1, wherein four wind collection sections or quadrants are defined around the upright support means.

4. The wind driven apparatus according to claim 3, wherein one or more dividing members are provided within each wind collection section or quadrant to divide the wind collection section or quadrant between two adjacent wind directing wall members into sub-sections or levels.

5. The wind driven apparatus according to claim 4, wherein the at least one opening is provided in each sub-section or level of each wind collection section or quadrant; and wherein a closure means is provided on and/or associated with the upright support means to allow selective closure of each of the at least one openings.

6. The wind driven apparatus according to claim 5, wherein the closure means is slidably or pivotably movable between open and closed positions.

7. The wind driven apparatus according to claim 5, wherein a control means is provided to allow automated and/or manual control of the closure means; wherein a drive means is provided to drive movement of the closure means; and/or a guide means is provided to guide movement of the closure means between the open and closed positions.

8. The wind driven apparatus according to claim 1, wherein the rotatable means is in the form of one or more blades or fins that are joined to, fixed relative to, or integral with the drive shaft means and extend outwardly from said drive shaft means; and wherein the drive shaft means is arranged to rotate about a central axis or an axis that is parallel or substantially parallel to a longitudinal axis of the upright support means and/or drive shaft means.

9. The wind driven apparatus according to claim 1, wherein each drive shaft segment is connected to an adjacent drive shaft segment via a connection means.

10. The wind driven apparatus according to claim 1, wherein the wind directing wall members are provided with drive shaft segment support means that extend inwardly of the upright support means into the inner compartment to support at least part of the plurality of drive shaft segments.

11. The wind driven apparatus according to claim 1, wherein the hydraulic pump means is used to drive an electricity generating means.

12. The wind driven apparatus according to claim 1, wherein a cooling means or one or more oil cooling radiators are provided to cool one or more components of the drive shaft means, the hydraulic pump means, the hydraulic fluid being driven by the hydraulic pump means, and/or the other components of the apparatus.

13. The wind driven apparatus according to claim 1, wherein one or more hydraulic conduits or inlet conduits are connected to the hydraulic pump means to provide hydraulic fluid to the hydraulic pump means.

14. The wind driven apparatus according to claim 1, wherein the apparatus includes a valve means connectable to the hydraulic pump means; and/or a control means is provided to control one or more parameters of the apparatus, valve means, electricity generating means, and/or hydraulic pump means.

15. A method of using wind driven apparatus, said wind driven apparatus including an upright support means, a plurality of wind directing wall members protruding outwardly from the upright support means at spaced apart intervals, the area between two adjacent wind directing wall members creating a wind collection section, and wherein said method includes the steps of collecting and directing wind into the wind collection section, directing the wind and/or air collected in the wind collection section through at least one opening defined in the upright support means in each wind collection section and into an inner compartment defined in the upright support means, using the wind and/or air to drive rotation of a drive shaft means and a rotatable means joined to, fixed relative to, or integral with the drive shaft means and located in the inner compartment of the upright support means, wherein the drive shaft means comprises a plurality of drive shaft segments arranged in a stacked arrangement, with one drive shaft segment arranged on top of an adjacent drive shaft segment; the stacked arrangement distributing the weight of the drive shaft means evenly or substantially evenly, over the plurality of drive shaft segments, thereby reducing the torque required to initiate rotation of the drive shaft means, and allowing the drive shaft means to rotate at lower wind speeds; and said wind driven apparatus including a hydraulic pump means which is arranged such that rotation of the drive shaft means is used to drive the hydraulic pump means.

16. The wind driven apparatus according to claim 11, wherein the electricity generating means and/or the hydraulic pump means are provided at a base of the apparatus.

* * * * *